(No Model.)
5 Sheets—Sheet 1.
J. FARRELL.
HAY FORK AND CARRIER.
No. 307,932.
Patented Nov. 11, 1884.
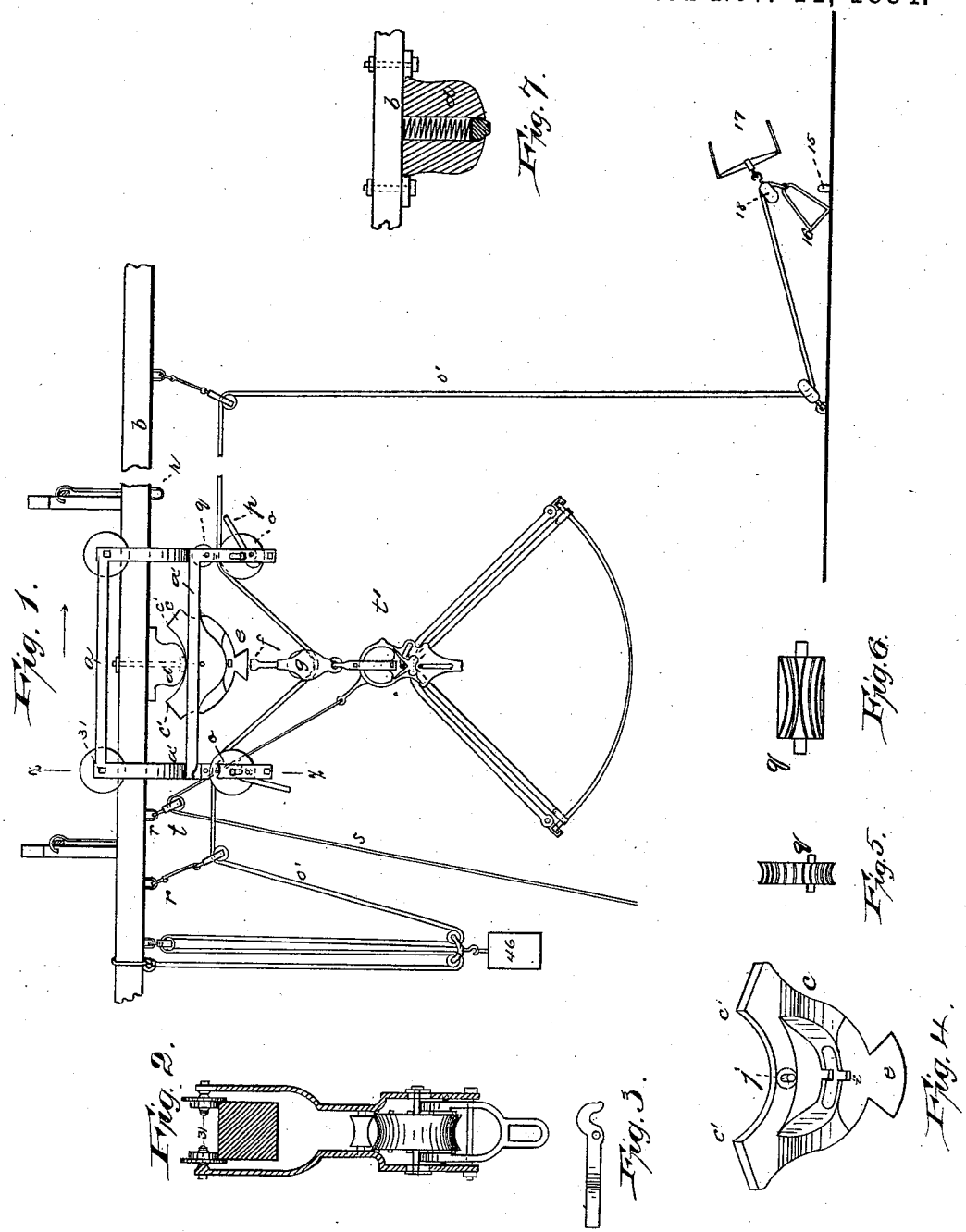
Attest:
T. H. Campbell.
Edward G. Kempf.
Inventor:
John Farrell,
by Drake & Co.
atty (No Model.)　　　　　　　J. FARRELL.　　　　　5 Sheets—Sheet 2.
HAY FORK AND CARRIER.
No. 307,932.　　　　　　　　　Patented Nov. 11, 1884.
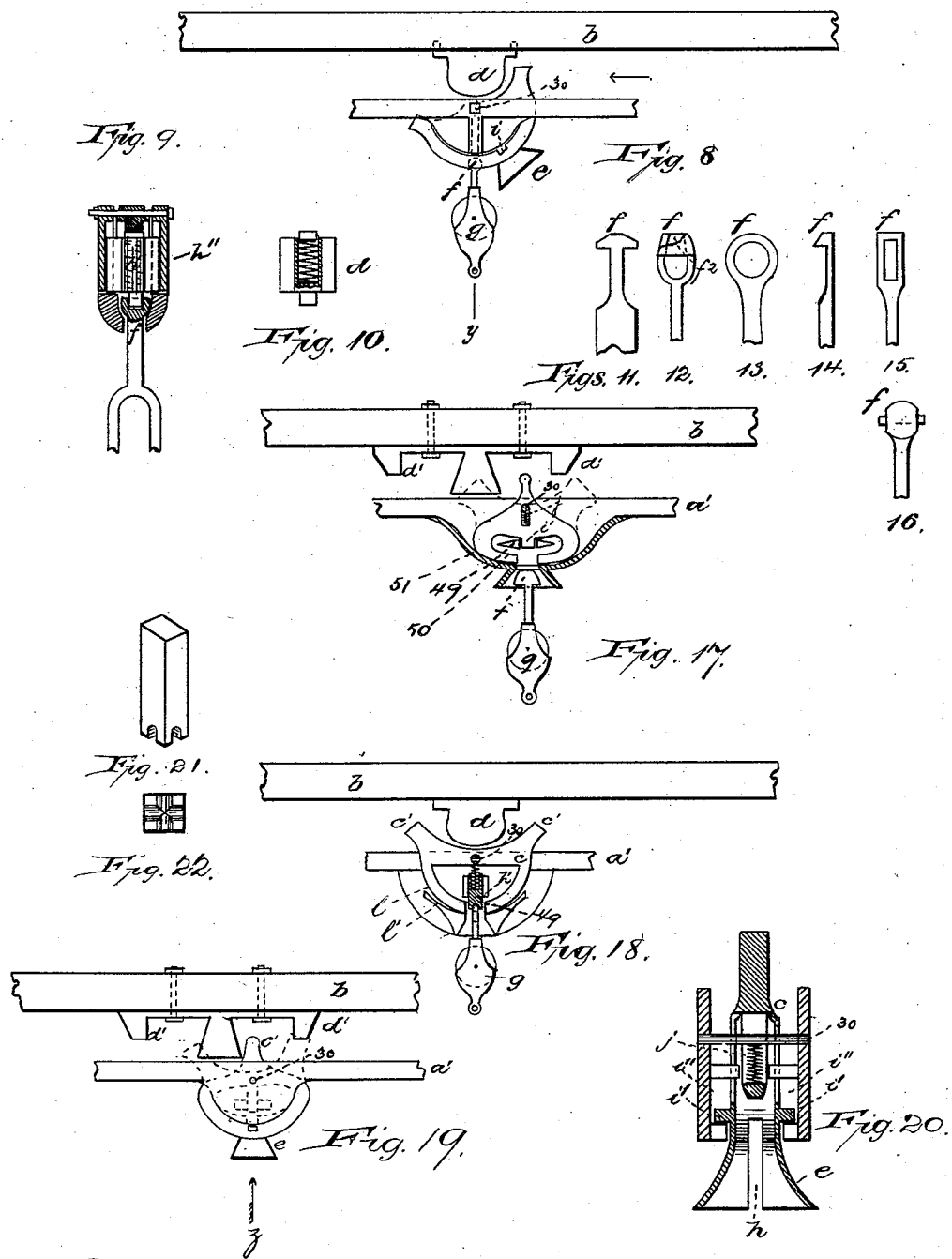
Attest  
F. F. Campbell  
Edward G. Kempf
Inventor:  
John Farrell,  
by Drake & Co.  
Att'ys.

(No Model.) 5 Sheets—Sheet 3.
J. FARRELL.
HAY FORK AND CARRIER.
No. 307,932. Patented Nov. 11, 1884.
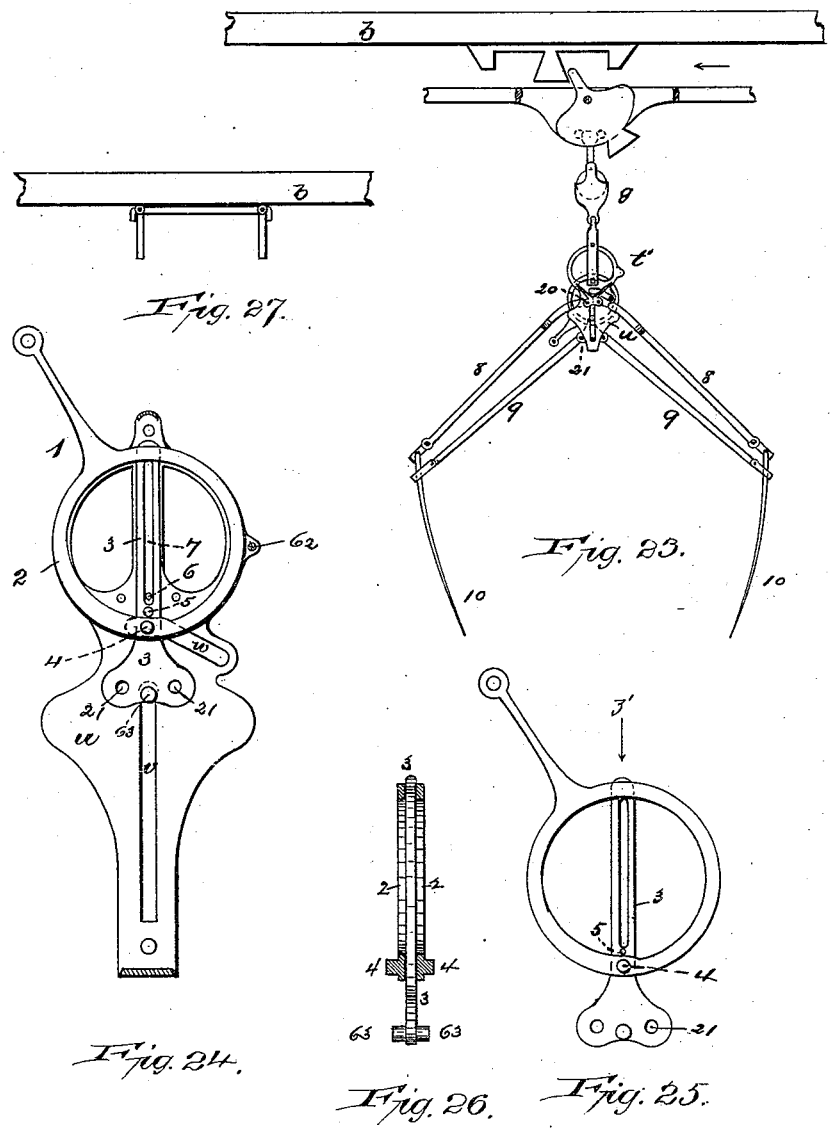

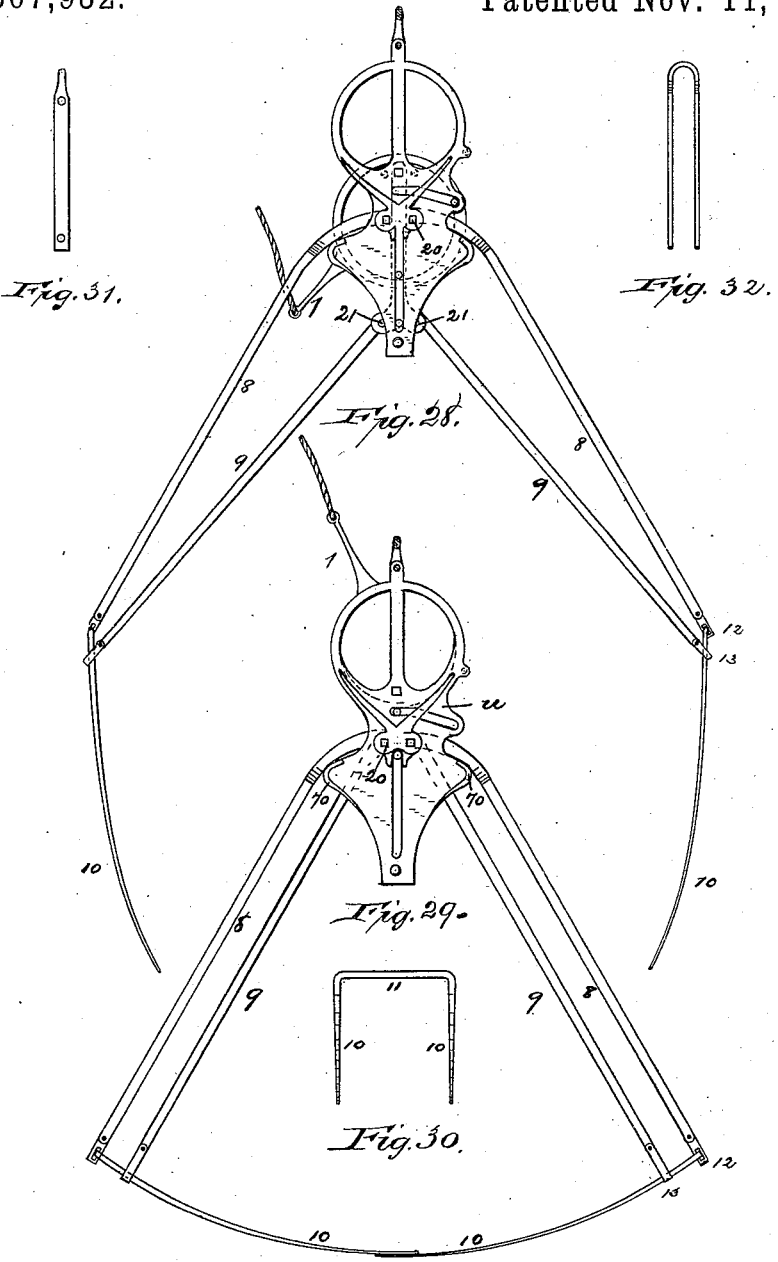

(No Model.)     5 Sheets—Sheet 5.
J. FARRELL.
HAY FORK AND CARRIER.
No. 307,932.     Patented Nov. 11, 1884.
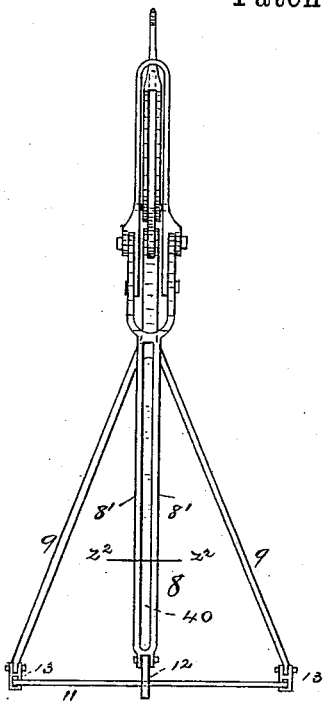
Fig. 33.
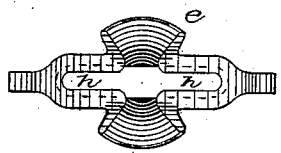
Fig. 34.
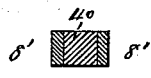
Fig. 35.
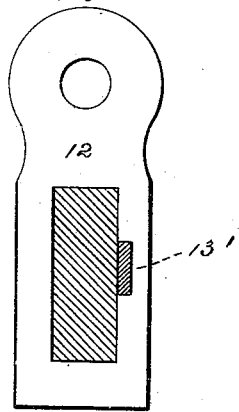
Fig. 38.
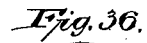
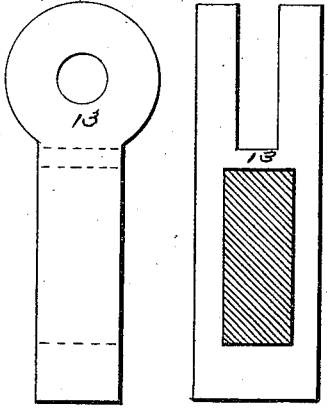
Fig. 36.   Fig. 37.
Attest     Inventor:
T. F. Campbell     John Farrell,
Edward G. Kempf     by Drake & Co.
     Att'ys.

UNITED STATES PATENT OFFICE.

JOHN FARRELL, OF ANDOVER, NEW JERSEY.

HAY FORK AND CARRIER.

SPECIFICATION forming part of Letters Patent No. 307,932, dated November 11, 1884.

Application filed January 21, 1884. (No model.)

*To all whom it may concern:*

Be it known that I, JOHN FARRELL, a citizen of the United States, residing at Andover township, in the county of Sussex and State of New Jersey, have invented certain new and useful Improvements in Hay Forks and Carriers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain modifications productive of the same general results as are accomplished by, and to certain improvements in, a device a patent for which was granted to me on the 6th day of March, 1883, numbered 273,350, the objects of the invention being to adapt the improved device to a single track; to reduce the cost of construction; to enable the operator to manipulate the various mechanisms with increased facility and ease; to reduce the amount of work required of the horse; and, finally, to provide a device capable of accomplishing the same results under differents conditions, and one of less complicated and otherwise cumbersome construction.

The invention consists in the peculiar arrangements and combinations of parts, substantially as will be hereinafter set forth, and finally embodied in the clauses of the claims.

Referring to the accompanying drawings, consisting of five sheets, in which like letters and figures of reference indicate corresponding parts in each of the several figures, Figure 1, Sheet 1, is a general view of the device, showing the operative relations of the several parts and the manner of working the same. Fig. 2 is a section of the car, taken through Fig. 1. Figs. 3, 5, and 6 are details of the said car. Fig. 4 is a detail view of the oscillating piece of the carriage. Fig. 7 is a detail of a stop-piece, showing certain modifications therein. Fig. 8, Sheet 2, shows the oscillating piece and pulley in engagement, illustrating the same when the said oscillating piece is about to engage with the stop-piece on the track to discharge the pulley. Fig. 9 is a section taken through $y$, Fig. 8. Fig. 10 is a section, also through $y$, illustrating one of several positions of a spring adapted to produce certain results. Figs. 11, 12, 13, 14, 15, and 16 illustrate various forms of an upward projection of a pulley adapted to engage with the carriage. Figs. 17, 18, 19, and 20 illustrate the carrying portion of the carriage, the last said figure being taken through line $z$, Fig. 19. Figs. 21, 22 are views illustrating a peculiar form of latch adapted especially to be employed with the pulley projection shown in Figs. 11 or 15, or where the projection is flat. Fig. 23, Sheet 3, illustrates a fork in combination with its pulley, carrier, and fork-operating mechanism. Fig. 24 is a detail view of said fork-operating mechanism with one of its plates removed to show the interior construction of the same. Fig. 25 illustrates a trip-lever and a vertically-sliding plate or bolt in relative position and free from their bed-plates. Fig. 26 is a section of the last, taken through line $z'$. Fig. 27 is a modified form of stop secured to a track. Fig. 28, Sheet 4, shows the fork and fork-operating mechanism as related when the fork is open, and Fig. 29 shows the same when the fork is closed. Fig. 30 is a plan of a fork detached from its operating mechanism. Figs. 31 and 32 are views of a clevis for said operating mechanism. Fig. 33 is an edge view of the fork-operating mechanism with the forks thereto attached. Fig. 34 is a bottom view of an oscillating piece before mentioned in connection with Fig. 4, showing a plan of a flaring funnel-shaped or hopper-shaped portion and slots leading oppositely therefrom. Fig. 35 is a section through line $z^2$, and illustrates a center resistance-bar composed of iron sections filled in between with a strip of wood. Figs. 36, 37, and 38 are views showing coupling-pieces adapted to unite fork-operating bars with the fork.

In carrying out the invention I construct a suitable carriage, $a$, Fig. 1, adapted to be drawn along or over a track, $b$, secured at any point in a barn or other situation. I prefer to build the track single or of one continuous rail because of its cheapness and ease of construction. The carriage, to suit said single track, is provided, at a point below the line of said track, with an oscillating piece, c, having a projection or projections, c', adapted to engage with and be actuated by a stop-piece, d, formed or arranged at any point upon or on a line with or beneath said track, said carriage being provided with depending portions a' a', which project or hang below the said track, and upon which the oscillating portion or piece is pivoted. To engage with said stop d on the track, the portions c' c' project upward from the body of the oscillating piece toward the track. The oscillating piece is adapted to be alike actuated when struck from either side in the movement of the carriage upon the track—a feature which enables the carriage to be sent from a central point in the barn to opposite points therein without necessitating the trouble of changing or reversing the position of the said carriage on said track. Said oscillating piece is provided with a single projection, c', Figs. 17, 19, 23, when a plurality of stops, d' d', are employed, or with a plurality of projections when a single stop is arranged on the track, the same principle being involved in both cases, as will be made evident hereinafter. Said oscillating piece is flaring, as at e, to receive a suitable knob or otherwise-shaped projection, f, on the pulley g. It is also provided with a slot, h, Fig. 34, leading in opposite directions from said bell-shaped portion, adapted to receive the shank or neck of the projection in such a way as to hold the knob in place upon the carriage while the latter is being drawn upon the track to and from the dumping-place. A suitable chamber or receptacle is provided to receive the knob or upper portion of the projection. It will thus be evident that the oscillating piece, as distinguished from a separate or a loose portion therewith connected, grasps or engages with the pulley projection to hold the same, doing away with independent hooks such as are described in the before-mentioned patent, and thus cheapening and simplifying the device. I may, if I so desire, substitute for the slotted oscillating piece one having hooks such as are shown in Fig. 17, adapted to pass through the projection of the pulley, said projection being perforated for that purpose, as shown in Figs. 12, 13, and 15.

From the foregoing it will be evident that I do not wish to be understood as limiting myself to any exact construction of the oscillating piece and its arrangement in the carriage, nor to the shapes disclosed of the projection of the pulley. The oscillating piece may be locked by an independent latch or bolt, h', to prevent pivotal movement, which latch may be spring-actuated to cause the same to engage with greater certainty a notch, i, Figs. 4 and 8. The oscillating piece itself may embody the latching or locking mechanism, a suitable projection or projections, i', Fig. 20, engaging a corresponding notch, recess, or groove, i'', in the carriage, to guide the said oscillating piece to a sliding movement, and this is the preferred construction, as it does away with the independent latch heretofore employed in the device illustrated in my prior patent. In this case the oscillating piece c is pivoted in a slot, j, Figs. 17, 20, provided with a spring, which bears upon said oscillating piece and causes the same to pass with certainty into the notch of the carriage, whereby further movement is prevented.

As a further modification, the stop-piece, Fig. 7, may contain the spring, which, bearing against the oscillating piece, is adapted to produce the same result.

To produce in connection with the spring a certain friction whereby the oscillating piece (or the latch) is prevented from working loose, I form the curved surface l or the corresponding curved surface of the carriage, l', eccentric to the pivot 30, as shown in Fig. 18. When the pulley projection passes up into the oscillating piece, it enters into a socket or recess having a laterally unchangeable relation to the carriage, to hold the said projection while the oscillating piece enters into holding engagement with said projection. In Fig. 17, for example, the two lugs 49 receive the projection f between them when lifting the oscillating piece, and hold said projection into laterally-fixed relation to the carriage while said oscillating piece—or, in the case exemplified, the hooks thereof—turns into said holding relation to the projection. In Fig. 9 the same is illustrated in a modified form. The projection of the pulley is recessed, and receives a projection of the bolt or latch h'. The ears or ridges h'' of said latch work in suitable slots in the carriage, and are thus laterally unchangeable in relation to said carriage. The head of the projection engaging with the said fixed latch is also prevented from moving laterally while the oscillating piece catches the said head.

The carriage at each side of the oscillating piece is provided with friction-wheels o o, over which a draft-rope, o', passes, and between which the pulley g is suspended. In connection with said friction-wheels, I employ mechanism for clamping the rope and preventing the same from passing thereover when the opposite pulley is being used. Said clamping mechanism is preferably a lever or cam, p, which, bearing against the pulley-journal, throws the latter up, and thus binds by friction the rope between said pulley and a stationary piece, q. Said stationary piece or portion may, however, be done away with, and in lieu thereof a cam or eccentric may be employed to bind the rope against the wheel o, in which case the lever p may be done away with.

Other mechanism may be employed for clamping the rope without knotting the latter, and I do not wish to be understood as limiting myself to the mechanism shown. The framework of the carriage a extends upward on each side of the track b to points above the upper line of said track, whereat said carriage is provided with journals 31, which are cast integral with the said frame-work, and is provided with wheels which rest on the laterally-opposite edges of said track, as shown in Fig. 2. By this construction the carriage is prevented from being drawn from the track by any lateral pull from either side, the carriage is prevented from swinging to any objectionable extent, and the wheels are more firmly and strongly held than when bolted in the usual way.

Upon the under side of the track are arranged eyes or staples r, to receive a trip-rope pulley, t. They are so placed as to allow the carriage and oscillating piece to pass freely by the same.

From the pulley g, suspended between the wheels o o on the rope o', hangs the forks and fork-operating mechanism t'. (Shown more in detail in Figs. 23, 24, and 25.) Said fork-operating mechanism is composed of a bed, u, consisting, preferably, of side plates, which are vertically slotted at v and transversely slotted at w. Between said plates works a trip-lever, 1, which is provided with two rounded parts, 2 2, separated by a slot in which a vertically-sliding bolt, 3, is placed. Said rounded portion of the trip-lever is provided with laterally-projecting lugs 4, which move in the transverse slots w, while the bolt is provided with similar lugs which work in the vertical slot v. Said bolt is also provided with lugs 5, adapted to engage with the interior edge of the rounded portion 2. A lug, stud, or connection, 6, upon the side plates, working in the vertical slot 7 of the bolt, guides said bolt vertically.

Upon the bed-plate u, and resting or being held in a flaring position by the bearings 70 70, cast integral with the said bed-plate, are pivoted resistance bars 8 8, for operating the fork.

To the vertically-moving bolts are pivoted pulling-bars 9 9. The former of said bars are pivoted upon the fork at a point farther from the point of the tines, while the pulling-bars are pivoted nearer said points, as will be understood. The fork is of one piece, made, preferably, as shown in Fig. 30, having curved tines 10 10, connected by a straight cross-bar, 11. It is connected to the bars 8 and 9 by coupling-pieces 12 and 13, which are slipped over the tines and into position on the cross-bar and tines, and thereat keyed in any suitable manner, 13', Fig. 37, indicating the key. The resistance-bar is coupled to the straight cross-bar, while the pulling-bars are secured to the tines at a point nearer the teeth, as shown.

To shorten the distance of travel for the horse, and to increase the speed of the car, I provide a loop or catching device or other mechanism or means adapted to enable the horse to raise the weight of the load to the carriage, and then, when the weight of the load is held by the carriage, to increase the speed of the load, all by a uniform and continuous speed of the horse. To this end I provide, preferably, a loop or anchor, 16, for catching upon a suitable projection or detent, 15, Fig. 1, and secure the same to the draft-rope o' at a point beyond the pulley 18 of the whiffletree 17. Upon starting the horses with their load, the loop drags along with the whiffletree and pulley until the raising operation is completed and the load is caught and suspended from the carriage prior to rolling the same over the track. At this point, when the full strength of the horse is no longer required to raise the load, the loop catches upon or is detained by the detent and the draft-rope draws over the pulley 18, greatly increasing the speed of the load upon the carriage, and producing the distance of travel that would otherwise be required of the horse. It is not necessary that the detent be, as shown, on the ground, or that a loop or anchor be employed, as the same result may be accomplished by securing the end of the rope to any fixture and making a knot in said rope at a distance from said fixture equal to the height of the load, which rope is slack when the load is being raised. The knot engages with the pulley and prevents the rope from drawing through it. When the slack is all drawn out, and the load is at the same time in engagement with the carriage, the pulley begins to act as before, with the same results. The resistance-bar 8 is made double, as shown in Figs. 33, 35, and between the iron sections 8' 8' is secured longitudinally with said sections a wooden strengthening-piece, 40, the three parts being suitably bolted together to prevent the iron sections from bowing and then breaking when end-strain is brought to bear.

To enable the car to return to its locking position on the track after the load is discharged from the fork, I provide an improved arrangement whereby a given fall of the weight will draw the carriage four times the length of said fall at a moderate speed. The improvement consists in looping the rope between the sheaves of the double pulley 43 and over the pulley 44, whereby the increase of speed is gained. The sheaves of the double pulley being spread, as shown, prevents the rope from twisting and becoming entangled.

It will be understood that the oscillating piece is adapted to be worked equally well from either direction.

The operations of the various portions of the device are substantially as follows, reference being had more especially to Fig. 1: The wagon-load of hay being drawn to the barn and the horse being attached to the elevating-rope by means of the whiffletree 17, the operator on the load grasps the resistance-bars of the fork, and, spreading the latter, forces the tines into the hay. The horse is then started and the draft-rope raises the pulley g, and with it the clevis of the fork-operating mechanism. The draft on the side plates tends to draw the forks together and to raise the same to the carriage. The projection f of the pulley g strikes the latch, Figs. 9, 18, or a portion of the oscillating piece, Figs. 17, 19, 20, and frees said oscillating piece, and at the same time it is caught in the socket between the lugs or projections 49, or an equivalent socket, so that said projection is prevented from making any lateral movement while the oscillating piece enters into engagement with it and secures the same to the carriage. At this point in the proceedings the loop 16, or its equivalent mechanism, is detained by the detent, so that subsequent passage of the load is facilitated. The oscillating piece being turned down so as to allow the projection thereof farthest from the horse to pass under the stop, continued draft on the rope $o'$ causes the carriage to move over the track and the weight 46 to rise. When the forkful of hay reaches the point of discharge, the trip-rope $s$ is pulled, causing the trip-lever to be drawn back from its center of gravity and to fall from the position shown in Fig. 24 to that shown in Fig. 23. This allows the vertically-sliding bolt 3 to fall and the weight of the hay to spread the tines apart, as will be understood. The horse is then turned around and the weight draws the carriage back to the stop, which engages the elevated projection of the oscillating piece, (shown in Fig. 8,) which projection is depressed until the projection $i'$ on the rotating piece, or the latch $h'$, reaches the notch $i$, when the spring enters into play and operates to force the parts into locked combination, the stop being thus detained between the projections $c'$, or the single projection between the stops $d'$ $d'$, so that further progress of the carriage is prevented. The fork then descends, and on the way down the trip-rope is pulled and the forks locked. The pulling of the rope raises the trip-lever, and with it the curved portion thereof, the exterior curved edge bearing against the lug 62, while the pins or lugs 4 slide toward the inner end or seated portion of the slot. This action raises the vertical bolt 3, because the lug 5 thereof rests on the inner edge of the curved portion of the lever. The lugs or projections 63 guide said bolt to the vertical action. When the lug 4 passes the center of the lug 5, the parts are locked, so that any pivotal action of the tines is prevented. When it becomes desirable to change the direction of the carriage so that it may travel in the opposite direction, I loosen the weighted end of the rope and change it to the opposite side of the carriage, and release the clamped rope working over the pulley $o$, at the same time clamping the other side, and also change the whiffletree or the horse to the opposite side or end of the rope. I then hook the trip-rope pulley to the opposite hook or eye in the track, when the parts are ready for manipulation, as before described.

The operations of changing the pulleys and clamping devices are accomplished by a suitable hooked pole prepared for the purpose, so that it becomes unnecessary to climb to the rafters of the barn.

Having thus described the invention, what I claim as new is—

1. In combination, a track having a stop, $d$, depending therefrom, and a carriage having an oscillating piece, $c$, having portions $c'$ projecting toward said track, and adapted to engage with and be operated by said stop from either direction, as set forth.

2. In combination, in a hay fork and carrier, the carriage-frame, a piece working therein, having a flaring or hopper-shaped portion, $e$, adapted to receive a pulley projection, and said pulley having said projection, said parts being arranged and combined substantially as set forth.

3. In a hay fork and carrier, the oscillating piece having the hopper-shaped portion, with a slot leading therefrom to receive the pulley projection $f$, substantially as set forth.

4. In a hay fork and carrier, the combination, with a carriage having an oscillating piece adapted to be locked stationary therein, of a spring operating to lock the said piece, substantially as and for the purposes set forth.

5. In a hay fork and carrier, the combination, with a carriage having a rotating portion adapted to be locked stationary therein, and having a notch whereby said rotating portion is locked, of a spring operating to lock said oscillating piece, substantially as set forth.

6. In a hay fork and carrier, the combination, with a carriage having an oscillating portion adapted to grasp or hold from either side thereof the projection of the pulley, and said pulley having said projection, substantially as and for the purposes set forth.

7. In a hay fork and carrier, an oscillating piece working in a slot in the carriage, and a spring bearing thereon, substantially as and for the purposes set forth.

8. In a hay fork and carrier, a carriage having the pivotal studs 31, formed integral with the frame, to receive the track-wheels, said frame extending on both sides of the track and the studs projecting thereon toward one another, substantially as set forth.

9. In combination with a carriage having a device for catching a pulley-block, and having two clamping devices, arranged one on each side of said catching device, a pulley suspended on a rope between said clamping devices, and adapted to be raised into engagement with said catching device, and a hay-fork suspended from said pulley-block, all said parts being arranged and operating substantially as and for the purposes set forth.

10. In a hay fork and carrier, the combination of the single track having the stop-piece, and having the staples or eyes $r$ secured on the under side thereof and at each side of the stop-piece, the carriage, the fork-operating mechanism, the trip-rope, and the trip-rope pulley adapted to be transported from the eye on one side of the stop-piece to that on the other side, substantially as herein set forth and shown.

11. In combination, the track, the carriage-frame depending from said track, and having an oscillating piece centrally arranged thereon, with pulleys and clamping devices at each side thereof, a rope passing from one of said pulleys to the other, adapted to be clamped by said clamping device, and a pulley, $g$, arranged on said rope between said clamping devices, and adapted to be clamped by said clamping device, and adapted to engage with said oscillating piece, all said parts being arranged and operating substantially as and for the purposes set forth.

12. In combination, the carriage and track, the pulley $g$, the rope $o$, detent 15, and pulley 18, attached to the harness of the horse, said parts being arranged and operating to cause the horse to raise the load to the carriage at a given speed and cause said carriage and load to travel over the track at an increased speed.

13. In a hay fork and carrier, the combination, with the draft-rope, of a pulley adapted to be attached to the harness of a horse, and a loop or anchor adapted to engage with a detent, substantially as set forth and shown.

14. In a hay fork or carrier, the oscillating piece $c$, having or bearing on a surface, 51, eccentric to the pivot 30, to cause a friction in its rotation, substantially as set forth and shown.

15. The pulley projection $f$, having the recess $f^2$, to receive a corresponding projection in the carriage and prevent lateral movement of the said head when entering into engagement with the rotating piece, as set forth.

16. In a fork-operating device of a hay fork and carrier, the combination of the plates $u$, having the vertical slot $v$ and transverse slot $w$, and having the resistance-bars 8 pivoted thereon, the vertically-sliding bar or bolt 3, having the lug 63, sliding in the vertical slot $v$, and having lugs 5 to engage the trip-lever, said sliding bar having the pulling-bars 9 pivoted thereon, the trip-lever having the rounded portion provided with lugs 4, which work in the said transverse slots, the said pulling-bars connecting the tines 10 and said bolt 3, the resistance-bar connecting the plate $u$ with the cross-piece of the fork, and said fork having said tines and cross-piece, all said parts being arranged and operating substantially as set forth.

17. In combination, the plate $u$, having the vertical slot $v$, transverse slot $w$, and bearing 62, a vertically-sliding plate or bolt having the lugs 5 and 63, and the trip-lever having the rounded portion 2 and lug 4, all said parts being arranged and operating substantially as set forth and shown.

18. In a fork-operating device of a hay fork and carrier, the bearings 70 70, cast integral with the bed-plate and receiving the resistance-bars 8 8, to form a firm support for the same, as set forth.

19. In combination, the plates $u$, having therein a sliding bolt and a lever to operate the same, resistance-bars pivoted to said plate, pulling-bars pivoted to the said sliding bolt, and the tines, all arranged and operating substantially as set forth and shown.

20. The fork having the curved tines, intermediate coupling-pieces capable of being slipped over the tines, secured in proper position, and the cross-piece, substantially as set forth and shown.

In testimony that I claim the foregoing I have hereunto set my hand this 7th day of September, 1883.

JOHN FARRELL.

Witnesses:
  CHARLES H. PELL,
  C. P. KARR.